US012320293B1

(12) United States Patent
Sibbach et al.

(10) Patent No.: US 12,320,293 B1
(45) Date of Patent: Jun. 3, 2025

(54) TURBINE ENGINE INCLUDING A STEAM SYSTEM

(71) Applicant: General Electric Company, Schenectady, NY (US)

(72) Inventors: Arthur W. Sibbach, Boxford, MA (US); James R. Reepmeyer, Montgomery, OH (US); Koji Asari, Sharonville, OH (US); Erich Alois Krammer, West Chester, OH (US); Robert R. Rachedi, Morrow, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/515,864

(22) Filed: Nov. 21, 2023

(51) Int. Cl.
*F02C 3/30* (2006.01)
*F01K 11/02* (2006.01)
*F23R 3/28* (2006.01)

(52) U.S. Cl.
CPC ............... *F02C 3/30* (2013.01); *F01K 11/02* (2013.01); *F23R 3/286* (2013.01)

(58) Field of Classification Search
CPC ................................................ F01K 17/025
See application file for complete search history.

(56) References Cited

U.S. PATENT DOCUMENTS

| 2,906,093 | A | * | 9/1959 | Robinson | .................. | F02K 3/00 |
| | | | | | | 60/39.24 |
| 3,868,818 | A | * | 3/1975 | Itoh | ........................... | F02C 3/36 |
| | | | | | | 60/39.15 |
| 4,081,956 | A | | 4/1978 | Baker et al. | | |
| 4,569,195 | A | | 2/1986 | Johnson | | |
| 5,042,246 | A | | 8/1991 | Moore et al. | | |
| 5,121,596 | A | * | 6/1992 | Takehara | .................. | F02C 7/27 |
| | | | | | | 60/39.55 |

(Continued)

FOREIGN PATENT DOCUMENTS

DE   102009022491 A1   1/2011

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — Katheryn A Malatek
(74) *Attorney, Agent, or Firm* — Smith Gambrell & Russell LLP

(57) ABSTRACT

A turbine engine for an aircraft includes a turbo-engine with a core air flow path, a fan having a fan shaft coupled to the turbo-engine to rotate the fan shaft, and a steam system. A combustor is positioned in the core air flow path to combust fuel and to generate combustion gases. The steam system is fluidly coupled to the core air flow path to provide steam to the core air flow path. The steam system includes a boiler to generate the steam, a water pump, and a controller. The water pump is in fluid communication with the boiler to direct a flow of water into the boiler. The controller is operatively coupled to the water pump to control the output of the water pump, the flow of the water into the boiler, and the amount of the steam injected into the core air flow path.

20 Claims, 4 Drawing Sheets

(56) References Cited

U.S. PATENT DOCUMENTS

| | | | | |
|---|---|---|---|---|
| 5,307,619 | A | * | 5/1994 | McCarty .................. F02C 9/28 60/39.3 |
| 5,369,951 | A | * | 12/1994 | Corbett ................ F01K 21/047 60/39.55 |
| 5,896,740 | A | | 4/1999 | Shouman |
| 7,367,192 | B2 | | 5/2008 | Hattori et al. |
| 8,613,186 | B2 | | 12/2013 | Koganezawa et al. |
| 8,813,473 | B2 | | 8/2014 | Fletcher et al. |
| 9,527,008 | B2 | * | 12/2016 | Hoehn ................ B01D 3/4216 |
| 9,689,280 | B2 | | 6/2017 | Watanabe et al. |
| 11,603,798 | B1 | | 3/2023 | Terwilliger et al. |
| 2002/0116930 | A1 | * | 8/2002 | Anderson ................ F02C 1/007 60/39.182 |
| 2006/0130482 | A1 | * | 6/2006 | Chino .................... F01K 23/10 60/670 |
| 2011/0220317 | A1 | * | 9/2011 | Kidwell ................ F24T 10/17 165/287 |
| 2012/0285175 | A1 | | 11/2012 | Fletcher et al. |
| 2014/0260314 | A1 | * | 9/2014 | Koganezawa ............ F02C 9/40 60/787 |
| 2022/0297844 | A1 | | 9/2022 | Mackin et al. |
| 2023/0125840 | A1 | | 4/2023 | Rutar |
| 2023/0150678 | A1 | * | 5/2023 | Klingels .............. B01D 5/0081 244/55 |
| 2023/0258126 | A1 | | 8/2023 | Terwilliger |
| 2023/0279806 | A1 | * | 9/2023 | Terwilliger ............. F02C 7/224 60/775 |
| 2023/0296034 | A1 | * | 9/2023 | O'Donnell ............. F03G 4/063 |
| 2024/0011417 | A1 | * | 1/2024 | Sibbach .................. F01D 21/12 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

Sibbach et al., U.S. Appl. No. 18/366,249, filed Aug. 7, 2023.
Sibbach et al., U.S. Appl. No. 18/463,774, filed Sep. 8, 2023.
Sibbach et al., U.S. Appl. No. 18/463,782, filed Sep. 8, 2023.
Sibbach, U.S. Appl. No. 18/468,189, filed Sep. 15, 2023.
Sibbach et al., U.S. Appl. No. 18/468,198, filed Sep. 15, 2023.
Sibbach et al., U.S. Appl. No. 18/366,256, filed Aug. 7, 2023.
Sibbach et al., U.S. Appl. No. 18/451,429, filed Aug. 17, 2023.
Sibbach, U.S. Appl. No. 18/448,597, filed Aug. 11, 2023.
The Extended European Search Report released by the European Patent Office on Mar. 17, 2025 in corresponding European Patent Application No. EP24206274.3; 9 pages.

\* cited by examiner

TURBINE ENGINE INCLUDING A STEAM SYSTEM

TECHNICAL FIELD

The present disclosure relates generally to turbine engines including a steam system.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
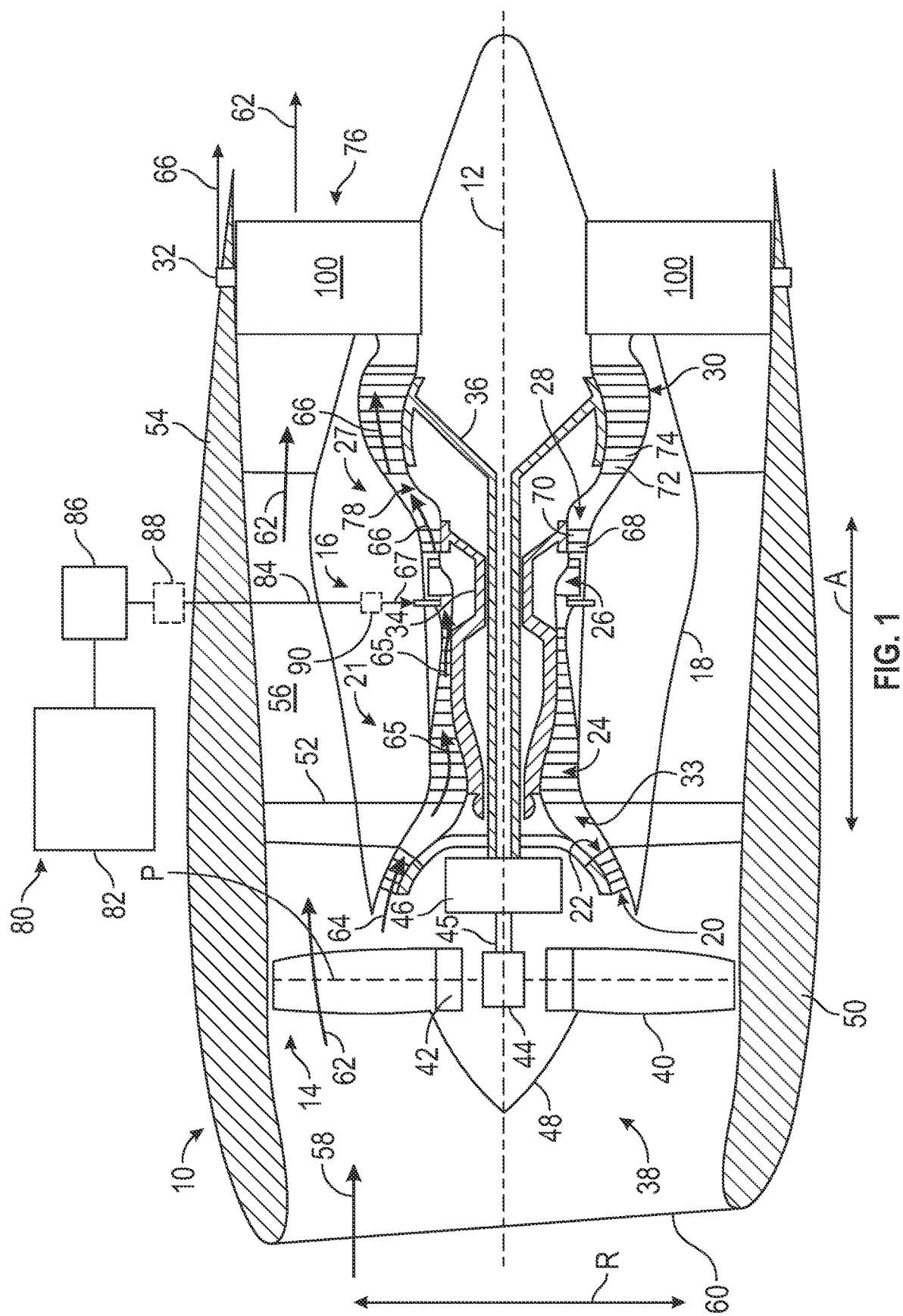
FIG. 1 is a schematic cross-sectional diagram of a turbine engine including a steam system, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and the like, may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet, and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

References to "inner" and "outer" when discussed in the context of radial directions refer to positions relative to the longitudinal centerline of the component.

As used herein, a "bypass ratio" of a turbine engine is a ratio of bypass air through a bypass of the turbine engine to core air through a core inlet of a turbo-engine of the turbine engine.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

As used herein, a "core air flow path zone" is a portion (i.e., a region or an area) of the core air flow path where core air flowing through the core air flow path has different or distinct thermodynamic properties from surrounding or adjoining regions of the core air flow path.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low-power" setting defines the engine configured to operate at a power output lower than a "high-power" setting of the engine, and a "mid-level power" setting defines the engine configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine detailed herein are defined as a percentage of a sea level static (SLS) maximum engine rated thrust. Low-power operation includes, for example, less than thirty percent (30%) of the SLS maximum engine rated thrust of the turbine engine. Mid-level power operation includes, for example, thirty percent (30%) to eighty-five (85%) of the SLS maximum engine rated thrust of the turbine engine. High-power operation includes, for example, greater than eighty-five percent (85%) of the SLS maximum engine rated thrust of the turbine engine. The values of the thrust for each of the low-power operation, the mid-level power operation, and the high-power operation of the turbine engine are exemplary only, and other values of the thrust can be used to define the low-power operation, the mid-level power operation, and the high-power operation.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section of the turbine engine to generate combustion gases for driving a turbine in the core section. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. After flowing through the steam turbine, the steam may be injected into a core air flow path. The desired amount of steam may vary based on the operational condition of the turbine engine, such as power level, and the amount of steam injected by the steam system into the core air flow path may be controlled based on the operational condition of the turbine engine. As discussed herein, the steam injected into the core air flow path may be controlled by controlling a water pump that directs the flow of water into a boiler that generates the steam.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a turbo-engine 16 disposed downstream from the fan section 14.

The turbo-engine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure (LP) shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the core air flow path 33, or, more specifically, into the core inlet 20. The ratio between the first portion of air (bypass air 62) and the second portion of air (core air 64) is known as a bypass ratio. In some embodiments, the bypass ratio is greater than 18:1, enabled by a steam system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, such as, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66, after being routed through the steam system 100 (as discussed below), are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the turbo-engine 16.

As noted above, the compressed air 65 (the core air 64) is mixed with the fuel 67 in the combustor 26 to form a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel, and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
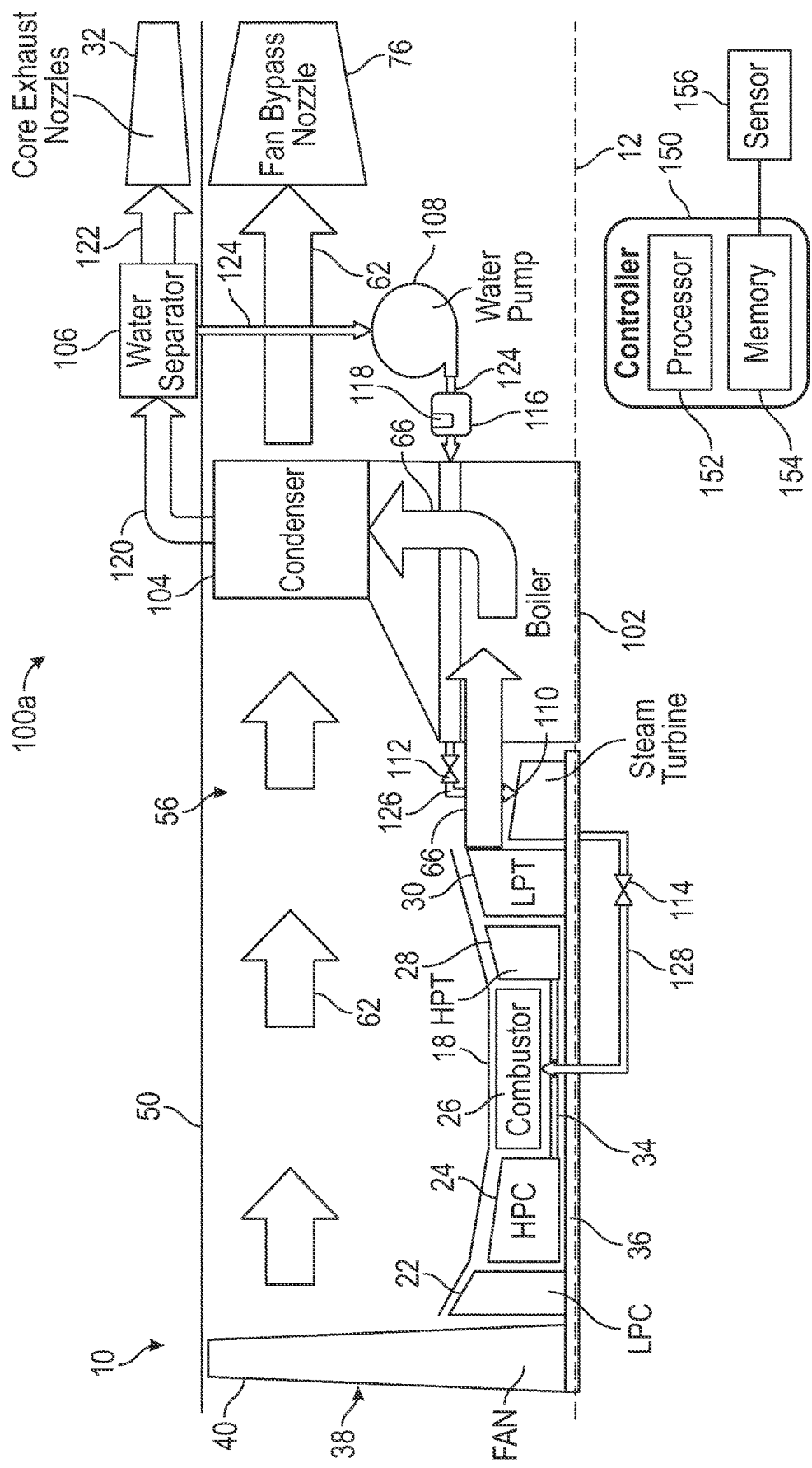
FIG. 2 is a schematic diagram of the turbine engine and the steam system of FIG. 1, according to the present disclosure.

FIG. 2 is a schematic diagram of the turbine engine 10 having a steam system 100a, according to an embodiment of the present disclosure. For clarity with the other steam systems discussed herein, the steam system 100a of this embodiment will be referred to as a first steam system 100a. The first steam system 100a may be used as the steam system 100 in the turbine engine 10 shown in FIG. 1. For clarity, various features of the turbine engine 10 described and shown above are shown schematically in FIG. 2 and some components are not shown in FIG. 2, but the description of such components also applies here. The first steam system 100a includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water (e.g., in liquid form) from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the turbo-engine 16. The water separator 106 may be driven to rotate by one of the engine shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water 124 through the boiler 102 where the water 124 is converted back to steam. This steam is sent through the steam turbine 110, and then injected into core air flow path 33, such as into the combustor 26.

In operation, the combustion gases 66, also referred to as exhaust, flow from the LPT 30 into the boiler 102. The combustion gases 66 transfer heat into the water 124 (e.g., in liquid form) within the boiler 102, as detailed further below. The combustion gases 66 then flow into the condenser 104. The condenser 104 condenses the water 124 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 124 from the combustion gases 66, to generate an exhaust-water mixture 120. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 120 flows into the water separator 106. The water separator 106 separates the water 124 from the exhaust of the exhaust-water mixture 120 to generate separate exhaust 122 and the water 124. The exhaust 122 is exhausted out of the turbine engine 10 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 120, and the exhaust 122 through the first steam system 100a of the turbine engine 10.

The water pump 108 pumps the water 124 (e.g., in liquid form) through one or more water lines (as indicated by the arrow for the water 124 in FIG. 2) and the water 124 flows through the boiler 102. As the water 124 flows through the boiler 102, the combustion gases 66 flowing through the boiler 102 transfer heat into the water 124 to vaporize the water 124 and to generate the steam 126 (e.g., vapor). The steam turbine 110 includes one or more stages of steam turbine blades (not shown) and steam turbine stators (not shown). The steam 126 flows from the boiler 102 into the steam turbine 110, through one or more steam lines (as indicated by the arrow for the steam 126 in FIG. 2), causing the steam turbine blades of the steam turbine 110 to rotate, generating additional work in an output shaft (e.g., one of the engine shafts) connected to the turbine blades of the steam turbine 110.

As noted above, the turbo-engine 16 includes shafts, also referred to as engine shafts, coupling various rotating components of the turbo-engine 16 and other thrust producing components such as the fan 38. In the turbo-engine 16 shown in FIG. 1, these engine shafts include the HP shaft 34 and the LP shaft 36. The steam turbine 110 is coupled to one of the engine shafts of the turbo-engine 16, such as the HP shaft 34 or the LP shaft 36. In the illustrated embodiment, the steam turbine 110 is coupled to the LP shaft 36. As the steam 126 flows from the boiler 102 through the steam turbine 110, the kinetic energy of this gas is converted by the steam turbine 110 into mechanical work in the LP shaft 36. The reduced temperature steam (as steam 128) exiting the steam turbine 110 is then injected into the core air flow path 33, such as into the combustor 26, upstream of the combustor 26, or downstream of the combustor 26. The steam 128 flows through one or more steam lines from the steam turbine 110 to the core air flow path 33. The steam 128 injected into the core air flow path 33 adds mass flow to the core air 64 such that less core air 64 is needed to produce the same amount of work through the turbine section 27. In this way, the first steam system 100a extracts additional work from the heat in exhaust gas that would otherwise be wasted. The steam 128 injected into the core air flow path 33 is in a range of 20% to 50% of the mass flow through the core air flow path 33.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the first steam system 100a recovers approximately 70% of the water 124 and converts the water 124 into the steam 126. The steam turbine 110 has a pressure expansion ratio in a range of 2:1 to 6:1, the LPT 30 has a pressure expansion ratio in a range of 4.5:1 to 28:1, and the steam 128 contributes to 20% to 50% of the mass flow through the core air flow path 33. The steam turbine 110 expands the steam 126, reducing the energy of the steam 128 exiting the steam turbine 110 and reducing the temperature of the steam 128 to approximately a temperature of the compressed air 65 (see FIG. 1) that is discharged from the HPC 24. Such a configuration enables the steam 128 to reduce hot spots in the combustor 26 from the combustion of the fuel (e.g., in particular, when the fuel is supercritical hydrogen or gaseous hydrogen).

The steam 128 injected into the core air flow path 33 also enables the HPT 28 to have a greater energy output with fewer stages of the HPT 28 as compared to HPTs without the benefit of the present disclosure. For example, the additional mass flow from the steam 128 through the turbine section 27 helps to produce a greater energy output. In this way, the HPT 28 may only have one stage capable of sustainably driving a greater number of stages of the HPC 24 (e.g., ten, eleven, or twelve stages of the HPC 24) due to the higher mass flow (resulting from the steam injection) exiting the combustor 26. The steam 128 that is injected into the core air flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 126, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, which increases the thermal efficiency of the turbine engine 10 as compared to HPCs and turbine engines without the benefit of the present disclosure. Further, the HPC 24 may have a reduced throat area due to the added mass flow in the turbo-engine 16 provided by the steam 126, 128 injected into the turbo-engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves may be positioned between a fourth stage of the HPC 24 and a last stage of the HPC 24. The HPC stator vanes are variable stator vanes, and the one or more compressor bleed valves help to balance the air flow (e.g., the compressed air 65) through all stages of the HPC 24. Such a balance, in combination with the steam 128 injected into the core air flow path 33, enables the number of stages of the HPC 24 to include ten to twelve stages for compression ratios to be greater than 20:1, and, such as, in a range of 20:1 to 40:1.

The additional work that is extracted by the first steam system 100a and the steam 128 injected into the core air flow path 33 enables a size of the turbo-engine 16 (FIG. 1) to be reduced, increasing the bypass ratio of the turbine engine 10, as compared to turbine engines without the benefit of the present disclosure. In this way, the turbine engine 10 has a bypass ratio greater than 18:1, such as, in a range of 18:1 to 100:1, in a range of 25:1 to 85:1, or in a range of 28:1 to 70:1. In this way, the first steam system 100a can enable an increased bypass ratio in which the turbine engine 10 can move a greater mass of air through the bypass, reducing the pressure ratio of the fan 38 and increasing the efficiency of the turbine engine 10 as compared to turbine engines without the benefit of the present disclosure.

The steam system 100 depicted in FIG. 2 also includes a controller 150. The controller 150 may be a separate, stand-alone controller operable as described herein, or may be another controller of the turbine engine 10, such as an engine controller. The engine controller may be a Full Authority Digital Engine Control (FADEC). The controller 150 is configured to operate various aspects of the steam system 100a, including, in this embodiment, a first steam control valve 112, a second steam control valve 114, and the water pump 108. In this embodiment, the controller 150 is a computing device having one or more processors 152 and one or more memories 154. The processor 152 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 154 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 154 can store information accessible by the processor 152, including computer-readable instructions that can be executed by the processor 152. The instructions can be any set of instructions or a sequence of instructions that, when executed by the processor 152, causes the processor 152 and the controller 150 to perform operations. In some embodiments, the instructions can be executed by the processor 152 to cause the processor 152 to complete any of the operations and functions for which the controller 150 is configured, as will be described further below. The instructions can be software written in any suitable programming language, or can be implemented in hardware. Additionally, and/or alternatively, the instructions can be executed in logically and/or virtually separate threads on the processor 152. The memory 154 can further store data that can be accessed by the processor 152.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 150 may be coupled to one or more sensors 156, such as a plurality of sensors. Such sensors 156 may be, for example, temperature sensors, pressure sensors, or flow sensors, such as the flow meter 116, discussed further below. The sensors 156 may be positioned at various suitable locations within the turbine engine 10, including within the core air flow path 33. For example, one sensor 156 of the plurality of sensors may be positioned upstream of the combustor 26, such as at compressor discharge outlet, in the mixing chamber, or as a part of the mixer assembly 140. Another sensor 156 of the plurality of sensors may positioned in the hot gas path 78 (i.e., flow path of the combustion gases 66) downstream of the combustor 26, such as at the nozzle (inlet) or the outlet of the HPT 28 or the LPT 30. The controller 150 may receive the input from the one or more sensors 156 and determine the power level of the turbine engine 10 or flow rate of the core air 64 based on the input received from the sensors 156.

As noted above, the first steam system 100a includes a water pump 108 that is positioned to increase the flow of the water 124 flowing into the boiler 102, resulting in an increase in pressure of the water 124. The water pump 108 similarly provides for an increase in pressure of the steam 126 flowing into the steam turbine 110 and pressure of the steam 128 flowing into the combustor 26. The turbine engine 10 does not operate in a steady operating condition. Instead, the turbine engine 10 is operated in various different operating conditions. For example, during a normal operating cycle for an aircraft, the turbine engine 10 may operate at high power for takeoff and climb (a high-power operation or condition) and at a low power (e.g., idle) for descent (a low-power operation or condition). High power and low power are taken relative to each other in this context. During flight, the turbine engine 10 may also be operated at cruise, which includes power conditions (operation) between the high-power condition and the low-power condition discussed above. At the different operating conditions, the amount of steam that is injected into the combustor 26 may be adjusted to have, for example, less steam for a low-power operation and more steam for a high-power operation.

The flow of the steam 128 into the core air flow path 33 may be controlled, at least in part, by one or more valves. The first steam system 100a depicted in FIG. 2 includes one or more flow control valves positioned between the boiler 102 and the combustor 26 to control the amount of steam flowing into the combustor 26. In this embodiment, a first steam control valve 112 is positioned in the flow path (e.g., line) between the boiler 102 and the steam turbine 110, and a second steam control valve 114 is positioned in the flow path (e.g., line) between the steam turbine 110 and the combustor 26. The first steam control valve 112 is thus positioned upstream of the steam turbine 110 and downstream of the boiler 102 to control the flow of the steam 126 into the steam turbine 110. Similarly, the second steam control valve 114 is positioned upstream of the combustor 26 and downstream of the steam turbine 110 to control the flow of the steam 128 into the combustor 26. Any suitable flow control valve may be used as the first steam control valve 112 or the second steam control valve 114. Such flow control valves may have a closed position and a plurality of open positions including a fully open position. The flow control valves may be electrically operable valves, hydraulically operable valves, or pneumatically operable valves. When the flow control valves are hydraulically operable, the hydraulic fluid may be suitable fluids of the turbine engine 10 including, for example, the fuel 67, lubrication oil, and the like.

Various suitable water pumps may be used as the water pump 108 including variable speed water pumps. The water pump 108 may be, for example, a centrifugal pump. When the water pump 108 is a centrifugal pump, the flow rate of the steam 128 entering the combustor 26 is a function of combustor pressure and the injector (e.g., nozzle) injecting the steam 128 into the combustor 26. The controller 150 may be communicatively and operatively coupled to the second steam control valve 114 to change the position (i.e., to move) the second steam control valve 114 between the plurality of open positions and to control the overall flow rate of the steam 128 entering the combustor 26. When the water pump 108 is a centrifugal pump, the first steam control valve 112 may be used to control the differential pressure (pressure drop) across the steam turbine 110 and the rotational speed and other operating conditions of the steam turbine 110 may be controlled directly. This arrangement of the first steam control valve 112 and the second steam control valve 114 with the water pump 108 being a centrifugal pump may thus allow the pressure drop across the steam turbine 110 to be controlled somewhat independently from the flow rate of the steam 128 into the combustor 26.

Alternatively, the water pump 108 may be a positive-displacement pump. When the water pump 108 is a positive-displacement pump, the speed of the water pump 108 and the displacement of the water pump 108 control the flow of the steam 126 into the steam turbine 110 and the combustor 26. In this case, the first steam control valve 112 and/or the second steam control valve 114 may be used to control the differential pressure (pressure drop) across the steam turbine 110.

As noted above, the controller 150 is communicatively and operatively coupled to the first steam control valve 112 and the second steam control valve 114. The controller 150 may also be communicatively and operatively coupled to the water pump 108 to control the speed and/or the displacement of the water pump 108. The controller 150 may thus control the position of the first steam control valve 112 and the second steam control valve 114 in response to an input received by the controller 150 indicating a change in the operating condition of the turbine engine 10. For example, the controller 150 may receive an input indicating a change in the throttle position or other input indicating a change in the amount of fuel 67 being provided to the combustor 26, and the controller 150 may change the position of the first steam control valve 112 and/or the second steam control valve 114 in response to this input. As noted above, the controller 150 may also be coupled to the sensors 156 positioned within the turbine engine 10 and/or on the aircraft. Such sensors 156 may include, for example, temperature sensors and/or pressure sensors positioned within the core air flow path 33 (e.g., the hot gas path 78). The temperature sensors and the pressure sensors are communicatively coupled to the controller 150. The controller 150 is configured to receive an input from one of the temperature sensors indicating a temperature of the turbine engine 10, and the controller 150 is configured to receive an input from one of the pressure sensors indicating a pressure of the turbine engine 10. The input received from the temperature sensors and/or the pressure sensors may be the input indicating a change in the operating condition of the turbine engine 10.

As noted above, the water pump 108 may be a variable speed water pump, a variable displacement water pump, or both. The controller 150 may also control the speed of the water pump 108, the displacement of the water pump 108, or both. The controller 150 is configured to change the output of the water pump 108 by, for example, changing the speed or the displacement of the water pump 108. Increasing the speed or the displacement of the water pump 108 increases the mass flow of the water output by the water pump 108, and decreasing the speed or the displacement of the water pump 108 decreases the mass flow of the water output by the water pump 108. The controller 150 may control the speed of the water pump 108, the displacement of the water pump 108, or both, in response to an input received by the controller 150 indicating a change in the operating condition of the turbine engine 10, such as the inputs discussed above.

The controller 150 may be configured to control the output of the water pump 108, such as the mass flow of the water 124 from the water pump 108 based on the current or the desired operating condition of the turbine engine 10. More specifically, the controller 150 may be configured to control the output of the water pump 108 to reach a target mass flow based on the current or the desired operating condition of the turbine engine 10. The first steam system 100a may include a flow meter 116 located between the water pump 108 and the boiler 102 to measure the output of the water pump 108, such as in the flow path of the water 124 from the water pump 108 to the boiler 102. The controller 150 may be coupled to the flow meter 116 to receive an input from the flow meter 116 and to determine a mass flow of the water 124 output by the water pump 108. Based on the determined mass flow, the controller 150 may then be configured to control the output of the water pump 108 to reach the target mass flow. Various suitable flow meters may be used as the flow meter 116 including, for example, mass flow meters or volumetric flow meters. If the flow meter 116 is a volumetric flow meter, the first steam system 100a may also include a temperature sensor 118 located between the water pump 108 and the boiler 102 to measure the temperature of the water 124 output from the water pump 108. The controller 150 is coupled to the temperature sensor 118 to receive an input from the temperature sensor 118 and to convert the volumetric flow measured by the flow meter 116 to a mass flow. The temperature sensor 118 may be co-located with the flow meter 116.

Figure 3:
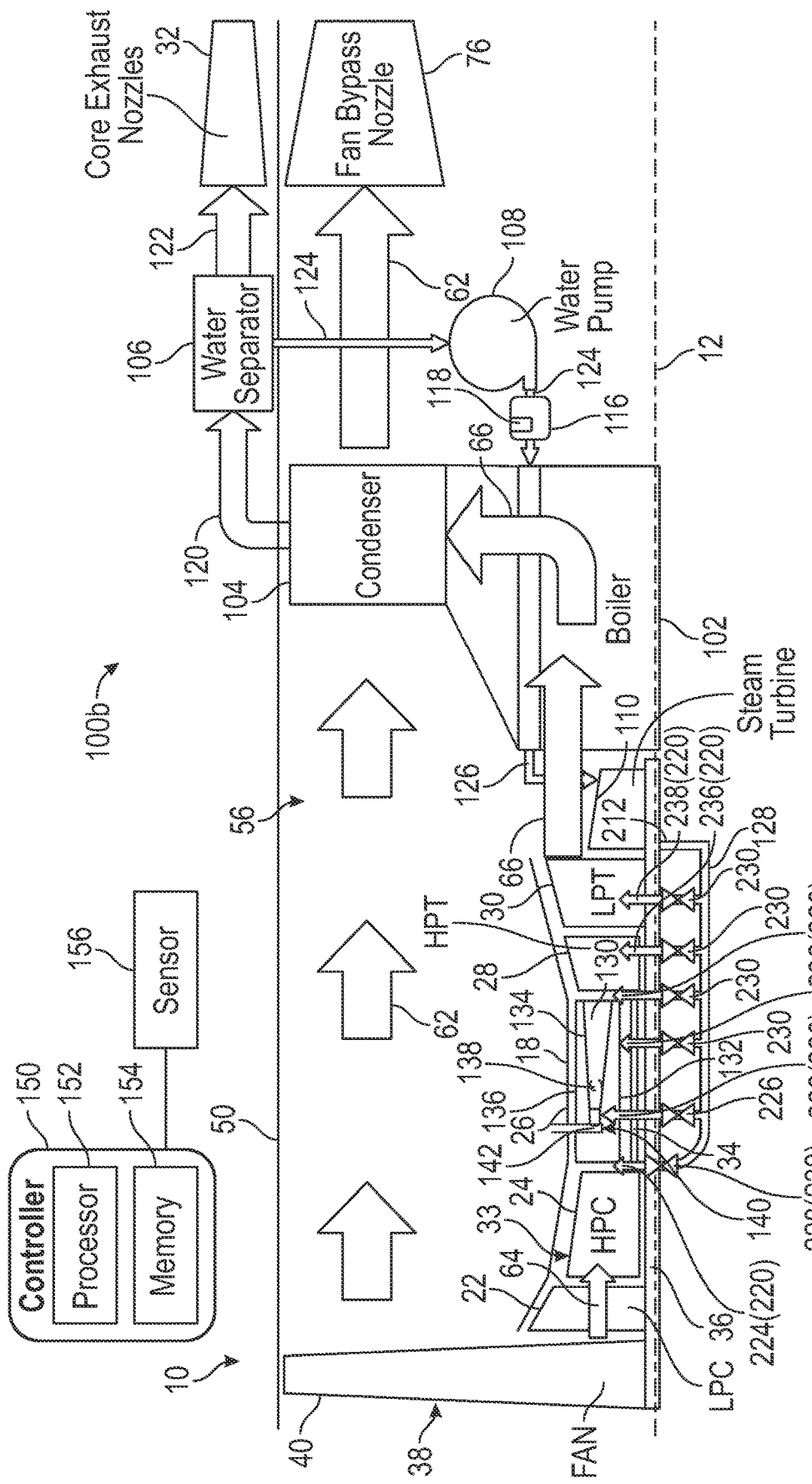
FIG. 3 is a schematic diagram of the turbine engine and a steam system according to an embodiment of the present disclosure.

FIG. 3 is a schematic diagram of the turbine engine 10 having a steam system 100b according to another embodiment of the present disclosure. For clarity with the other steam systems discussed herein, the steam system 100b of this embodiment will be referred to as a second steam system 100b. The second steam system 100b may be used as the steam system 100 in the turbine engine 10 shown in FIG. 1. The second steam system 100b is similar to the first steam system 100a discussed above with reference to FIG. 2. The same reference numerals will be used for components of the second steam system 100b that are the same as or similar to the components of the first steam system 100a discussed above. The description of these components above also applies to this embodiment, and a detailed description of these components is omitted here. Similarly, any one of the features described in the first steam system 100a with reference to FIG. 2 or described in the second steam system 100b with reference to FIG. 3 may be used with the other one of the first steam system 100a or the second steam system 100b.

In the first steam system 100a, the steam 128 was discussed as being injected into the core air flow path 33 with the first steam control valve 112 and the second steam control valve 114 controlling the flow of the steam 128 into the core air flow path 33. The steam 128 may be injected into the core air flow path 33 in a more complex manner as depicted more specifically in FIG. 3. The second steam system 100b depicted in FIG. 3 includes a steam injection system 200 and a steam delivery assembly 212. The second steam system 100b is fluidly coupled to the core air flow path 33 via a steam delivery assembly 212. The steam delivery assembly 212 includes one or more lines, conduits, pipes, tubes, etc., configured to carry the steam 128 from the steam source, such as the boiler 102, to the core air flow path 33. The steam delivery assembly 212 is fluidly connected to the core air flow path 33 to inject the steam 128 into the core air flow path 33 at a plurality of steam injection zones 220, adding mass flow to the core air 64, as discussed above. Each steam injection zone 220 of the plurality of steam injection zones 220 corresponds to one of the core air flow path zones.

Before discussing the steam injection zone 220 in more detail, the following will discuss additional features of the turbine engine 10. The combustor 26 is an annular combustor (i.e., annular about the longitudinal centerline axis 12) that includes a combustion chamber 130 defined between an inner liner 132 and an outer liner 134. Each of the inner liner 132 and outer liner 134 is annular about the longitudinal centerline axis 12 of the turbine engine 10 (FIG. 1) and may thus extend in the circumferential direction of the turbine engine 10. The combustor 26 is an annular combustor (i.e., annular about the longitudinal centerline axis 12) that includes a combustion chamber 130 defined between an inner liner 132 and an outer liner 134. Each of the inner liner 132 and the outer liner 134 is annular about the longitudinal centerline axis 12 of the turbine engine 10 (FIG. 1) and may thus extend in the circumferential direction of the turbine engine 10. The combustor 26 also includes a dome 136 mounted to a forward end of each of the inner liner 132 and the outer liner 134. The dome 136 defines an upstream (or forward end) of the combustion chamber 130.

A plurality of mixer assemblies 140 (only one is illustrated in FIG. 3) is spaced around the dome 136. The plurality of mixer assemblies 140 is circumferentially spaced about the longitudinal centerline axis 12 of the turbine engine 10 (FIG. 1). The mixer assembly 140 may be a swirler/fuel nozzle assembly that includes a fuel nozzle 142 receiving the fuel 67 from the fuel delivery assembly 84 (FIG. 1). The fuel 67 is injected into the combustion chamber 130 through one or more orifices formed in the mixer assembly 140. The mixer assembly 140 may be any suitable mixer assembly including rich burn mixer assemblies or lean burn mixer assemblies, such as a twin annular premixing swirler (TAPS). As noted above, the compressor section 21, including the HPC 24, pressurizes air, and the combustor 26 receives an annular stream of this pressurized air from a discharge outlet of the HPC 24. This air may be referred to as compressor discharge pressure air. The compressor discharge outlet may be positioned to discharge the compressor discharge pressure air into a mixing chamber, and then a portion of the compressor discharge air flows into the mixer assembly as primary air. The mixer assembly 140 may include a plurality of swirler vanes as part of a swirler that is used to swirl and to generate turbulence in the primary air flowing through the mixer assembly 140. The fuel nozzle 142 injects fuel 67 into the turbulent airflow of the primary air and the turbulence promotes rapid mixing of the fuel 67 with the primary air, generating a fuel-air mixture.

The fuel-air mixture is provided to the combustion chamber 130 from the mixer assembly 140 for combustion. Ignition of the fuel-air mixture is accomplished by an igniter (not shown), and the resulting combustion gases 66 flow in the axial direction A of the turbine engine 10 toward and into an annular turbine nozzle of the HPT 28. Much of the fuel 67 injected by the mixer assembly 140 is combusted in a primary combustion zone 138 in the region of the combustion chamber 130 directly downstream of the mixer assembly 140. The turbine nozzle is defined by an annular flow channel that includes a plurality of radially extending, circumferentially-spaced HPT stator vanes 68 (FIG. 1) that turn the gases so that the gases flow angularly and impinge upon the HPT rotor blades 70 (FIG. 1) of a turbine rotor of the HPT 28. The HPT 28 includes a rotor having a plurality of the HPT rotor blades 70. The HPT rotor blades 70 are circumferentially spaced, and the HPT stator vanes 68 are upstream of the HPT rotor blades 70. The rotor may be, for example, a disk or a blisk drivingly connected to the HP shaft 34. As discussed above, the second steam system 100b enables the use of a single stage HPT 28, but other HPTs may be used including those with two or more stages.

A portion of the compressor discharge pressure air may be used as dilution air (also referred to as secondary air). The dilution air flows around the outside of the inner liner 132 and the outer liner 134, and is introduced into the combustion chamber 130 by one or more dilution holes (not shown) formed in the inner liner 132 and the outer liner 134 at positions downstream of the mixer assembly 140. The dilution air helps quench combustion gases from the primary combustion zone 138 before being introduced into the turbine section 27. The dilution air bypasses the primary combustion zone 138 and is introduced into the combustion chamber 130 downstream of the primary combustion zone 138. Another portion of the compressor discharge pressure air may be directed into the HPT 28 as HPT cooling air. The HPT cooling air may be drawn from the dilution air and directed into the HPT rotor blades 70 and, more specifically, through cooling passages formed within the HPT rotor blades 70 to cool the HPT rotor blades 70.

As the core air 64 flows through the core air flow path 33, the thermodynamics of the core air 64 (and combustion gases 66) changes, as discussed above. Accordingly, the core air flow path 33 includes a plurality of core air flow path zones. As used herein, a core air flow path zone is a portion (i.e., a region or an area) of the core air flow path were the core air 64 has different or distinct thermodynamic properties from surrounding or adjoining regions. For example, the LPC 22 may be a core air flow path zone and the HPC 24 each may be a core air flow path zone as the pressure and the temperature of the core air 64 is increased in each of the LPC 22 and the HPC 24. In addition, the LPC 22 and the HPC 24 may be multi-stage compressors and each stage of the LPC 22 or HPC 24 may also be a core air flow path zone. Similarly, the combustor 26 and, more specifically, the primary combustion zone 138 may be a core air flow path zone. Similar to the LPC 22 and the HPC 24, the HPT 28 and the LPT 30 may be core air flow path zones, and each stage of the HPT 28 and LPT 30 may be a core air flow path zone. The core air flow path 33 of the turbine engine 10 is annular (i.e., annular about the longitudinal centerline axis 12) and each core air flow path zone may be annular bands of the turbine engine 10 and, more specifically, the core air flow path 33.

One of the plurality of steam injection zones 220 is a primary steam injection zone 222 located to inject at least a portion of the steam 128 into the primary air. The steam 128 may be injected into the combustor 26, such as into the combustion chamber 130 and, more specifically, into the primary combustion zone 138. As depicted in FIG. 2, the primary steam injection zone 222 is the primary combustion zone 138. The steam delivery assembly 212 is fluidly coupled to the mixer assembly 140 to provide the steam 128 to the mixer assembly 140 to be injected with the fuel 67 (FIG. 1) into the primary air and directly into the primary combustion zone 138.

Additionally, or alternatively, the steam 128 may be injected into the combustor 26 by being injected into a steam injection zone upstream of the combustor 26, and this zone will be referred to herein as an upstream steam injection zone 224. The upstream steam injection zone 224 may be downstream of the HPC 24, such as the mixing chamber. As discussed above, a portion of the primary air from the mixing chamber flows through the combustion chamber 130 and, more specifically, the primary combustion zone 138 and, thus, the steam 128 (or at least a portion thereof) injected into the upstream steam injection zone 224 may be injected into the primary air.

The first steam injection system 200 includes one or more steam flow control valves that are used to selectively direct the steam 128 into the core air flow path 33, and to control the flow of steam 128 into the different injection zones. Each of the steam flow control valves discussed herein is a flow control valve that controls the flow rate of the steam 128 through the flow control valve. The flow control valve may have a closed position and a plurality of open positions including a fully open position. When moving toward the closed position from one of the plurality of open positions, the valve is being closed and alternatively when moving from the closed positions or one of the open positions towards an open position that is more open, the valve is being opened. Additionally, the steam control valves may be proportional control valves that are positionable to direct the steam 128 in a proportion to a plurality of different locations, such as a three-way valve positionable to proportion the steam flowing through the steam flow control valve to one of two outlets. The flow control valves may be electrically operable valves, hydraulically operable valves, or pneumatically operable valves. When the flow control valves are hydraulically operable, the hydraulic fluid may be suitable fluids of the turbine engine 10 including, for example, the fuel 67, lubrication oil, and the like. As will be discussed in more detail below, these steam flow control valves are located in the steam delivery assembly 212 to direct a portion of the steam 128 into one or more steam injection locations 220 in the core air flow path 33.

As depicted in FIG. 2, the steam injection system 200 includes a primary steam flow control valve 226 that is operable to control the flow of the steam 128 into the primary steam injection zone 222. Likewise, the steam injection system 200 includes an upstream steam flow control valve 228 operable to control the flow of the steam 128 into the upstream steam injection zone 224. As the upstream steam flow control valve 228 also controls the flow of the steam 128 into the primary air and primary combustion zone 138, the upstream steam flow control valve 228 also may be considered a primary flow steam flow control valve.

As discussed above, the steam 128 may be injected into the core air flow path 33 in a range of 20% to 50% of the mass flow through the core air flow path 33. To achieve the benefits of waste heat recovery discussed herein, this amount of steam 128 (water vapor) is beneficial when flowing through the turbine section 27 and, more specifically, the HPT 28 and the LPT 30. In addition, the desired amount of steam may vary throughout the flight of the aircraft based on operating conditions. Introducing the steam amounts discussed above such that all of the steam 128 flows through the primary combustion zone 138 may cause issues with the stability of the flame and the flame dynamics in the combustion chamber 130. Accordingly, the steam 128 being injected at the primary steam injection zone 222, the upstream steam injection zone 224, or both, may be controlled, using the primary steam flow control valve 226 and the upstream steam flow control valve 228 to maintain the flow of steam through the primary combustion zone 138 at desired levels. With the flow rate of the steam injected at the primary steam injection zone 222 and the upstream steam injection zone 224 being limited to achieve the desired steam levels, the remaining portion of the steam 128 is injected into the core air flow path 33 at one or more zones downstream of the primary combustion zone 138, which are referred to herein as downstream steam injection zones or secondary steam injection zones. One or more secondary steam flow control valve 230 may be located in the steam delivery assembly 212 to control the flow of the steam 128 into the secondary steam injection zones.

Although the secondary steam flow control valve 230 may be an active valve, such as described above, the secondary steam flow control valve 230, alternatively, may be a pressure regulating valve. The pressure regulating valve is operable to inject steam at an output pressure proportional to a control pressure. The control pressure may be provided by another fluid of the turbine engine 10, such as the core air 64 and, more specifically, the pressure of the compressed air 65. The secondary steam flow control valve 230 may be fluidly connected to the core air 64 (e.g., the compressed air 65) to receive the control pressure.

With the steam 128 being injected into the mixing chamber, some of the steam 128 will be combined with the dilution air and the HPT cooling air to be injected into the combustor 26 and into the HPT 28, respectively, as a result of the natural division of the compressor discharge pressure air between the multiple flow paths of the compressor discharge pressure air downstream of the HPC 24. In this way, the steam 128 is introduced into the core air flow path 33 at zones downstream of the primary combustion zone 138, where the dilution air and the HPT cooling air flow into the hot gas path 78. Under certain operating conditions, such as high-power conditions having a relatively high steam demand, however, this natural flow division may not be sufficient to keep the primary air at the levels discussed above. Accordingly, the steam delivery assembly 212 is fluidly connected to the core air flow path 33 to inject the steam 128 at other downstream zones independently of the steam 128 being injected into the primary air (e.g., at the upstream steam injection zone 224).

The steam delivery assembly 212 may be fluidly connected to the HPT 28 to inject a portion of the steam 128 directly into the HPT 28. For example, the steam delivery assembly 212 may be fluidly connected to outlets, such as orifices, formed in the HPT stator vanes 68 of the HPT 28 to selectively inject steam 128 into the core air flow path 33. This steam injection zone is referred to herein as an HP turbine nozzle steam injection zone 232. As noted above, the HPT 28 may have one stage. If the HPT 28 has more than one stage, the HP turbine nozzle steam 234 and the HP turbine blade steam 236 may be directed through openings in any one or all of the stages.

The steam delivery assembly 212 also may be directly injected into the combustion chamber 130 at a position downstream of the primary combustion zone 138. A portion of the steam 128 may flow into a combustor liner passage around the combustor liner, (e.g., the inner liner 132, the outer liner 134, or both) and then into the combustion chamber 130 through steam holes located in the combustor liner downstream of the primary combustion zone 138. This steam injection zone is referred to herein as a downstream combustor steam injection zone 234. In addition to adding mass flow to the combustion gases 66, the steam 128 may be used to help cool the combustor liner, and the steam 128 injected in the downstream combustor steam injection zone 234 may be steam injected into a cooling flow path of the combustor 26.

The steam delivery assembly 212 may also be fluidly connected directly to the cooling passages formed in the HPT rotor blades 70, bypassing the mixing chamber, to inject a portion of the steam 128 into the HPT 28 via the HPT rotor blades 70. This steam 128 may be injected through openings (e.g., orifices) formed in the HPT rotor blades 70. This steam injection zone is referred to herein as an HP turbine blade steam injection zone 236.

While all of the steam 128 steam may flow through the HPT 28, a portion of the steam 128 may be directed into the LPT 30 through openings formed in one or more of the LPT rotor blades 74, such as, for example, the first stage LPT rotor. More specifically, the LPT rotor blade 74 may include cooling passages formed in the LPT rotor blade 74 through which cooling air, such as compressor bleed air drawn from one of the stages of the HPC 24, flows. The compressor bleed air may then be discharged from the cooling air passages through a plurality of openings (e.g., orifices) formed in the LPT rotor blades 74. The steam 128 being injected through the cooling passages formed in the LPT rotor blades 74 may be mixed with the compressor bleed air to be discharged through the openings in the LPT rotor blade 74. Alternatively, this steam 128 may be injected as pure steam. This steam injection zone is referred to herein as an LP turbine steam injection zone 238. Although described as being injected through the LPT rotor blades 74, the steam 128 injected in the LP turbine steam injection zone 238, or a portion thereof, may be additionally or alternatively injected into the LPT 30 through the LPT stator vanes 72.

Figure 4:
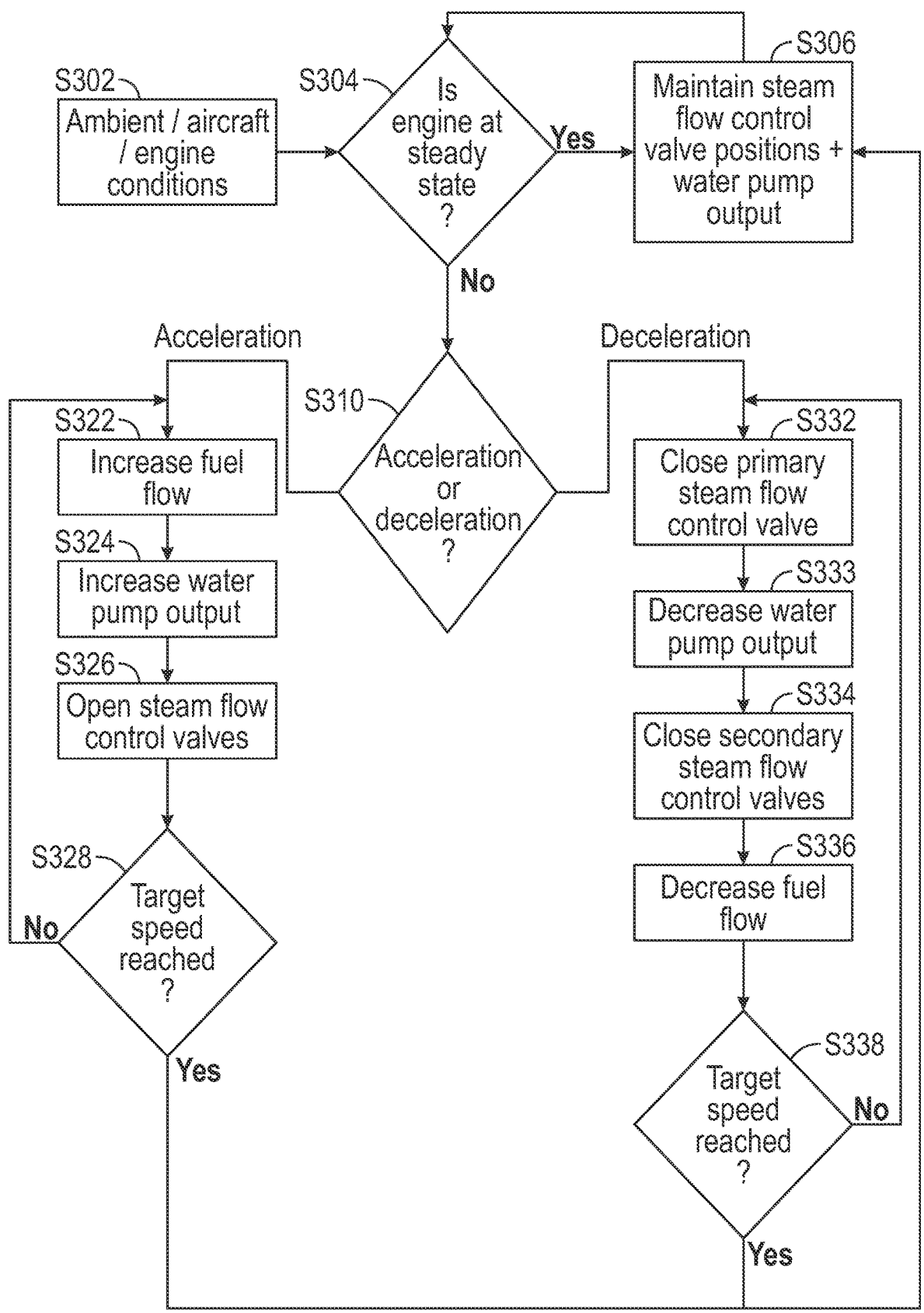
FIG. 4 is a flow chart showing a method of controlling the steam system shown in FIG. 3.

FIG. 4 is a flow chart showing a method of controlling the steam system shown in FIG. 3. Additional details of the method are described above relative to the operation and the description of the aforementioned components. This method may be implemented by the controller 150, and the controller 150 may be configured to perform the steps of the method discussed below. While the following discussion references the second steam system 100b, this discussion also applies to the first steam system 100a, and, when applied to the first steam system 100a, valve positioning to control the flow of the steam 128 may be accomplished by positioning one or both of the first steam control valve 112 and the second steam control valve 114.

The method may begin by monitoring, in step S302, the operational conditions of any one or all of the aircraft, the turbine engine 10, or ambient air. Operational conditions may include, for example, engine temperatures and pressures, such as the temperatures and pressures at various portions of the core air 64, bypass air 62, or ambient air surrounding the turbine engine 10. These conditions may also be rotational speeds of various shaft, such as the engine shafts discussed above. Such conditions may be monitored to determine if the turbine engine 10 is in a steady state operational condition in step S304. A steady state operational condition may be a condition where the turbine engine 10 is at a constant power level (accounting for average fluctuation) and not accelerating or decelerating. If the turbine engine 10 is at steady state, the positions of the primary steam flow control valve 226 and the secondary steam flow control valve 230 are maintained in step S306. The output of the water pump 108 may also be maintained in step S306. Although this discussion of the method refers to the primary steam flow control valve 226, the upstream steam flow control valve 228 may be a primary steam flow control valve and the discussion of the upstream steam injection zone 224 also applies to the upstream steam flow control valve 228 when used in that manner. Similarly, when the upstream steam flow control valve 228 is used as a secondary steam flow control valve, the discussion of the secondary steam flow control valve 230 also applies to the upstream steam flow control valve 228.

If the turbine engine 10 is changing its operational condition, the method proceeds to step S310 to determine if the change in operational condition of the turbine engine 10 is acceleration or deceleration. When implemented by the controller 150, the controller 150 may receive an input that indicates or is otherwise used to determine the change in operational condition of the turbine engine 10. Such inputs may include inputs and control signals from a flight controller, such as throttle inputs from the pilots. Other inputs include, for example, inputs relative to the conditions sensed by the controller 150, such as pressure or speed changes of the turbine engine 10.

If the turbine engine 10 is accelerating, the method moves to step S322, where the fuel 67 flow is increased such as by opening the metering valve 90. With the increase in steam demand, in step S324, the output of the water pump 108 is increased, in the manner discussed above, to increase the amount of the steam 128 flowing to the steam delivery assembly 212.

The primary steam flow control valve 226 is opened to increase the amount of the steam 128 into the primary steam injection zone 222. The steam flow may be increased proportionally to the flow of the fuel 67. In step S326, one or more of the steam flow control valves, such as the primary steam flow control valve 226 or the secondary steam flow control valve 230 may then be opened to provide the desired amount of steam 128 to the core air flow path 33. For example, the primary steam flow control valve 226 may be opened to increase the amount of the steam 128 into the primary steam injection zone 222, and the secondary steam flow control valve 230 may be opened to inject the remaining desired amount of steam 128 to the core air flow path 33. While this may be done actively, when a passive valve is used, such as the hydrodynamic pressure regulating valves discussed above, the secondary steam flow control valve 230 may be operated passively in response to the pressure change of the control pressure. The target speed of the turbine engine 10 is checked in step S328. If the target speed has not been reached, the method returns to step S322, but if the target speed is reached, the process returns to step S304.

If the turbine engine 10 is decelerating, the method moves to step S332, where the primary steam flow control valve 226 is closed, decreasing the flow of the steam 128 into the primary combustion zone 138. Then, in step S333, the output of the water pump 108 is reduced. In step S334, the secondary steam flow control valve 230 may then be closed to reduce the amount of the steam 128 into the core air flow path 33. While this may be done actively, when a passive valve is used, such as the hydrodynamic pressure regulating valves discussed above, the secondary steam flow control valve 230 may be operated passively in response to the pressure change of the control pressure. Then, the method proceeds to step S336 to decrease the fuel 67 flow such as by closing the metering valve 90. During deceleration of the turbine engine 10, the amount of the steam 128 injected into the primary steam injection zone 222 may be reduced to minimize the possibility of a flame-out occurring due to a reduction in fuel 67 flow. The steam 128 may be reduced prior to or simultaneously with the reduction in fuel 67 flow. The target speed of the turbine engine 10 is checked in step S338. If the target speed has not been reached, the method returns to step S332, but if the target speed is reached, the process returns to step S304.

The turbine engine 10 discussed herein includes a steam system 100 that is used to recover some of the energy from the waste heat by generating steam 126 and driving a steam turbine 110. After flowing through the steam turbine 110, the steam 128 may be injected into a core air flow path 33. The desired amount of steam 126, 128 may vary based on the operational condition of the turbine engine 10, such as power level, and the amount of steam 128 injected by the steam system 100 into the core air flow path 33 may be controlled based on the operational condition of the turbine engine 10 to provide a desired amount of steam 128. Embodiment discussed herein, provide methods and systems for controlling the amount of the steam 128 injected into the core air flow path 33 may be controlled by controlling a water pump that directs the flow of water into a boiler that generates the steam.

Further aspects of the present disclosure are provided by the subject matter of the following clauses.

A turbine engine for an aircraft. The turbine engine includes a turbo-engine, a fan having a fan shaft coupled to the turbo-engine to rotate the fan shaft, and a steam system. The turbo-engine includes a combustor, an engine shaft, and a turbine. The combustor is positioned in a core air flow path to receive compressed air. The core air flow path including a plurality of core air flow path zones for core air to flow therethrough. The combustor is fluidly coupled to a fuel source to receive fuel. The fuel is injected into the combustor to mix with the compressed air to generate a fuel and air mixture. The fuel and air mixture is combusted in a primary combustion zone of the combustor to generate combustion gases. The turbine is located downstream of the combustor to receive the combustion gases and to cause the turbine to rotate. The turbine is coupled to the engine shaft to rotate the engine shaft when the turbine rotates. The steam system is fluidly coupled to the core air flow path to provide steam to the core air flow path to add mass flow to the core air. The steam system includes a boiler, a water pump, and a controller. The boiler is located downstream of the combustor. The boiler receives water and is fluidly connected to the combustor to receive the combustion gases and to boil the water to generate the steam. The water pump is in fluid communication with the boiler to direct the flow of the water into the boiler. The controller is operatively coupled to the water pump to control an output of the water pump, the flow of the water into the boiler, and an amount of the steam injected into the core air flow path. The controller is configured to change the output of the water pump in response to an input received by the controller indicating a change in an operating condition of the turbine engine.

The turbine engine of the preceding clause, wherein the steam system includes a condenser positioned downstream of the boiler to condense the water from the combustion gases, the water pump being fluidly connected to the condenser to receive the water from the condenser.

The turbine engine of the preceding clause, wherein the condenser generates an exhaust-water mixture, and the steam system includes a water separator located downstream of the condenser to receive the exhaust-water mixture, the water separator separating the water from the exhaust-water mixture, the water pump being fluidly connected to the water separator to receive the water from the water separator.

The turbine engine of any preceding clause, further comprising a nacelle circumferentially surrounding the fan.

The turbine engine of any preceding clause, wherein the fan includes a plurality of fan blades that rotates to generate a volume of air.

The turbine engine of the preceding clause, wherein the nacelle defines a bypass airflow passage between the nacelle and the turbo-engine. The volume of air from the fan is split and flows into the bypass airflow passage as bypass air and flows into the core air flow path as the core air.

The turbine engine of the preceding clause, wherein the water separator is a cyclonic separator.

The turbine engine of any preceding clause, wherein the condenser is located in the bypass airflow passage for bypass air to cool the combustion gases and to condense the water from the combustion gases.

The turbine engine of any preceding clause, wherein, to control the output of the water pump, the controller is operatively coupled to the water pump to control a speed of the water pump.

The turbine engine of any preceding clause, wherein the water pump is a centrifugal pump.

The turbine engine of any preceding clause, wherein the water pump is a positive displacement pump.

The turbine engine of the preceding clause, wherein, to control the output of the water pump, the controller is operatively coupled to the water pump to control the displacement of the water pump.

The turbine engine of any preceding clause, wherein the steam system includes a flow meter located between the water pump and the boiler to measure the output of the water pump, the controller being coupled to the flow meter to receive an input from the flow meter, to determine a mass flow of the water output by the water pump, and to control the output of the water pump to reach a target mass flow.

The turbine engine of any preceding clause, wherein the flow meter is a mass flow meter.

The turbine engine of any preceding clause, wherein the flow meter is a volumetric flow meter, and the steam system includes a temperature sensor located between the water pump and the boiler to measure the temperature of the water output from the water pump, the controller being coupled to the temperature sensor to receive an input from the temperature sensor and to convert the volumetric flow measured by the flow meter to a mass flow.

The turbine engine of any preceding clause, wherein the steam system includes at least one steam control valve located downstream of the boiler and upstream of the core air flow path to control the flow of the steam into the core air flow path.

The turbine engine of the preceding clause, wherein the controller is operatively coupled to the at least one steam control valve to change the position of the at least one steam control valve in response to the input received by the controller indicating a change in the operating condition of the turbine engine.

The turbine engine of any preceding clause, wherein the steam system includes a steam turbine fluidly coupled to the boiler to receive the steam from the boiler and to cause the steam turbine to rotate, the steam turbine being coupled to the engine shaft to rotate the engine shaft when the steam turbine rotates.

The turbine engine of the preceding clause, wherein the at least one steam control valve is located upstream of the steam turbine.

The turbine engine of any preceding clause, wherein the at least one steam control valve is located downstream of the steam turbine.

The turbine engine of any preceding clause, wherein the at least one steam control valve is one of a plurality of steam control valves, the plurality of steam control valves including a first steam control valve and a second steam control valve, the first steam control valve located upstream of the steam turbine, and the second steam control valve located downstream of the steam turbine.

The turbine engine of any preceding clause, wherein the controller is communicatively coupled to a sensor that sends the input indicating the change in the operating condition of the turbine engine to the controller.

The turbine engine of any preceding clause, further comprising the sensor.

The turbine engine of any preceding clause, wherein the sensor is located in the core air flow path.

The turbine engine of any preceding clause, wherein the sensor is a temperature sensor and the input indicating the change in the operating condition of the turbine engine is a temperature detected by the temperature sensor.

The turbine engine of any preceding clause, wherein the sensor is a pressure sensor and the input indicating the change in the operating condition of the turbine engine is a pressure detected by the pressure sensor.

The turbine engine of any preceding clause, wherein the core air flow path includes a plurality of core air flow path zones, and the steam system is fluidly coupled to the core air flow path to inject the steam into the core air flow path at a plurality of steam injection zones, each steam injection zone of the plurality of steam injection zones corresponding to a core air flow path zone of the plurality of core air flow path zones.

The turbine engine of the preceding clause, wherein the steam system includes a primary steam flow control valve operable to control the flow of the steam into a primary steam injection zone, the primary steam injection zone being one steam injection zone of the plurality of steam injection zones, the primary steam injection zone being a steam injection zone positioned in the core air flow path such that the steam injected into the primary steam injection zone flows into the primary combustion zone, the controller being operatively coupled to the primary steam flow control valve and configured to adjust the position of the primary steam flow control valve to control the flow of the steam into the primary steam injection zone.

The turbine engine of the preceding clause, wherein the steam system includes a secondary steam flow control valve operable to control the flow of the steam into a secondary steam injection zone, the secondary steam injection zone being one steam injection zone of the plurality of steam injection zones, the controller operatively coupled to the secondary steam flow control valve and configured to adjust the position of the secondary steam flow control valve to control the flow of the steam into the secondary steam injection zone.

The turbine engine of any preceding clause, wherein the controller is configured to determine if the turbine engine is being accelerated or decelerated, and when the controller determines that the turbine engine is being accelerated or decelerated, the controller is configured to change the output of the water pump and to adjust the position of the primary steam flow control valve to change the flow of the steam into the primary steam injection zone.

The turbine engine of any preceding clause, wherein the controller is configured to determine if the turbine engine is being accelerated, and when the controller determines that the turbine engine is being accelerated, the controller is configured to change the output of the water pump and to adjust the position of the primary steam flow control valve to change the flow of the steam into the primary steam injection zone.

The turbine engine of the preceding clause, wherein, when the controller determines that the turbine engine is being accelerated, the controller is configured to increase the output of the water pump and to open the primary steam flow control valve to increase the flow of the steam into the primary steam injection zone.

The turbine engine of any preceding clause, wherein the controller is configured to determine if the turbine engine is being decelerated, and when the controller determines that the turbine engine is being decelerated, the controller is configured to change the output of the water pump and to adjust the position of the primary steam flow control valve to change the flow of the steam into the primary steam injection zone.

The turbine engine of the preceding clause, wherein, when the controller determines that the turbine engine is being decelerated, the controller is configured to close the primary steam flow control valve to decrease the flow of the steam into the primary steam injection zone and, after closing the primary steam flow control valve, to decrease the output of the water pump.

The turbine engine of any preceding clause, wherein the turbo-engine includes a compressor positioned in the core air flow path upstream of the combustor to compress core air to generate the compressed air, one steam injection zone being downstream of the compressor and upstream of the primary combustion zone.

The turbine engine of any preceding clause, wherein the turbo-engine includes a compressor positioned in the core air flow path upstream of the combustor to compress core air to generate the compressed air, one steam injection zone being downstream of the compressor and upstream of the combustor.

The turbine engine of any preceding clause, wherein one steam injection zone is the primary combustion zone.

The turbine engine of the preceding clause, wherein the turbo-engine includes a combined fuel and steam nozzle assembly to inject both the steam and the fuel into the primary combustion zone.

The turbine engine of any preceding clause, wherein one steam injection zone is a portion of the combustor downstream of the primary combustion zone.

The turbine engine of any preceding clause, wherein the combustor includes a combustor cooling passage, the steam being injected into the combustor through the combustor cooling passage.

The turbine engine of any preceding clause, wherein one steam injection zone is downstream of the combustor in the turbine.

The turbine engine of any preceding clause, wherein one steam injection zone is an inlet of the turbine.

The turbine engine of any preceding clause, wherein the turbine includes a turbine cooling passage, the steam being injected into the turbine through the turbine cooling passage.

The turbine engine of any preceding clause, wherein the turbine is a high-pressure turbine.

The turbine engine of any preceding clause, wherein the turbine is a low-pressure turbine.

The turbine engine of any preceding clause, wherein the steam system includes a primary steam flow control valve operable to control the flow of steam into a primary steam injection zone, the primary steam injection zone being one steam injection zone of the plurality of steam injection zones, the primary steam injection zone being a steam injection zone positioned in the core air flow path such that steam injected into the primary steam injection zone flows into the primary combustion zone.

The turbine engine of any preceding clause, wherein the steam system includes a secondary steam flow control valve operable to control the flow of steam into a secondary steam injection zone, the secondary steam injection zone being one steam injection zone of the plurality of steam injection zones.

The turbine engine of any preceding clause, wherein the primary steam injection zone is the primary combustion zone.

The turbine engine of any preceding clause, wherein the controller is operatively coupled to the primary steam flow control valve and configured to adjust the position of the primary steam flow control valve to control the flow of steam into the primary steam injection zone.

The turbine engine of the preceding clause, wherein the controller is operatively coupled to the secondary steam flow control valve and configured to adjust the position of the secondary steam flow control valve to control the flow of steam into the secondary steam injection zone.

The turbine engine of any preceding clause, wherein the controller is configured to determine if the turbine engine is being accelerated or decelerated.

The turbine engine of the preceding clause, wherein, when the controller determines that the turbine engine is being accelerated, the controller is configured to open the primary steam flow control valve to increase the flow of steam into the primary steam injection zone.

The turbine engine of any preceding clause, wherein, when the controller determines that the turbine engine is being decelerated, the controller is configured to close the primary steam flow control valve to decrease the flow of steam into the primary steam injection zone.

The turbine engine of any preceding clause, wherein the secondary steam flow control valve is a pressure regulating valve operable to inject steam at an output pressure proportional to a control pressure.

The turbine engine of the preceding clause, wherein the control pressure is a pressure of the core air.

The turbine engine of any preceding clause, wherein the turbo-engine includes a compressor positioned in the core air flow path upstream of the combustor to compress core air to generate the compressed air, the control pressure being the pressure of the core air at an outlet of the compressor.

The turbine engine of any preceding clause, wherein the turbine is a high-pressure turbine, and a steam injection zone is in the high-pressure turbine.

The turbine engine of any preceding clause, wherein the steam system includes a high-pressure turbine steam flow control valve to control the flow of steam to the high-pressure turbine.

The turbine engine of any preceding clause, wherein the high-pressure turbine includes a turbine rotor including a plurality of rotor blades, and a steam injection zone is the plurality of rotor blades.

The turbine engine of the preceding clause, wherein cooling air is provided to the plurality of rotor blades, the steam being mixed with the cooling air.

The turbine engine of any preceding clause, wherein the high-pressure turbine includes a plurality of stator vanes, and a steam injection zone is the plurality of stator vanes.

The turbine engine of the preceding clause, wherein cooling air is provided to the plurality of stator vanes, the steam being mixed with the cooling air.

The turbine engine of any preceding clause, wherein the turbo-engine includes a high-pressure compressor positioned in the core air flow path upstream of the combustor to generate the compressed air.

The turbine engine of any preceding clause, wherein the engine shaft is a high-pressure shaft.

The turbine engine of any preceding clause, wherein the high-pressure compressor is driven by the high-pressure shaft to compress the core air flowing through the core air flow path and to generate the compressed air.

The turbine engine of any preceding clause, wherein the turbo-engine includes a low-pressure compressor positioned in the core air flow path upstream of the high-pressure compressor to generate the compressed air.

The turbine engine of any preceding clause, wherein the turbo-engine includes a low-pressure turbine positioned in the core air flow path downstream of the high-pressure turbine to receive the combustion gases and to cause the turbine to rotate.

The turbine engine of any preceding clause, wherein the turbo-engine includes a low-pressure shaft, the low-pressure turbine coupled to the low-pressure shaft to rotate the low-pressure shaft when the low-pressure turbine rotates.

The turbine engine of the preceding clause, wherein one of the plurality of steam injection zones is in the low-pressure turbine.

The turbine engine of the preceding clause, wherein the low-pressure turbine includes a turbine rotor including a plurality of rotor blades, and a steam injection zone is the plurality of rotor blades.

The turbine engine of any preceding clause, wherein the turbo-engine includes a compressor positioned in the core air flow path upstream of the combustor to compress core air to generate the compressed air.

The turbine engine of the preceding clause, wherein the compressor is driven by the high-pressure shaft to compress the core air flowing through the core air flow path and to generate the compressed air.

The turbine engine of any preceding clause, wherein the turbine is a low-pressure turbine, and a steam injection zone is in the low-pressure turbine.

The turbine engine of the preceding clause, wherein the low-pressure turbine includes a turbine rotor including a plurality of rotor blades, and a steam injection zone is the plurality of rotor blades.

The turbine engine of any preceding clause, wherein the engine shaft is a low-pressure shaft and the turbine is a low-pressure turbine.

The turbine engine of any preceding clause, wherein the fan shaft is coupled to the low-pressure shaft to be driven by the low-pressure shaft.

The turbine engine of any preceding clause, wherein the steam system includes a steam delivery assembly fluidly coupled to the plurality of steam injection locations to inject the steam and the water into the core air flow path at the plurality of steam injection locations.

The turbine engine of any preceding clause, wherein the steam delivery assembly includes a steam inlet to receive the steam generated by the steam system.

The turbine engine of any preceding clause, wherein the steam flow control valve is located in the steam delivery assembly and operable to change the distribution of the steam being injected into the core air flow path.

The turbine engine of any preceding clause, wherein the steam delivery assembly is fluidly coupled to the steam system downstream of the steam turbine to receive the steam from the steam turbine.

A method of operating a turbine engine for an aircraft having a steam system. The method includes injecting fuel into a combustor positioned in a core air flow path to receive compressed air, mixing the fuel with the compressed air to generate a fuel and air mixture, combusting the fuel and air mixture in a primary combustion zone of the combustor to generate combustion gases. The method also includes boiling water in a boiler to generate steam, the boiler located downstream of the combustor and fluidly connected to the combustor to receive the combustion gases and to boil the water. The method further includes directing a flow of water into the boiler with a water pump and controlling an output of the water pump to control the amount of the steam injected into the core air flow path.

The method of the preceding clause, further comprising condensing the water from the combustion gases in a condenser positioned downstream of the boiler, the water pump being fluidly connected to the condenser to receive the water from the condenser.

The method of the preceding clause, wherein the condenser generates an exhaust-water mixture, and the method further comprises separating the water from the exhaust-water mixture using a water separator located downstream of the condenser to receive the exhaust-water mixture, the water pump being fluidly connected to the water separator to receive the water from the water separator.

The method of any preceding clause, wherein controlling the output of the water pump includes controlling the speed of the water pump.

The method of any preceding clause, wherein controlling the output of the water pump includes controlling the displacement of the water pump.

The method of any preceding clause, further comprising determining a mass flow of the water output by the water pump, and controlling the output of the water pump to reach a target mass flow.

The method of any preceding clause, further comprising measuring the output of the water pump with a flow meter located between the water pump and the boiler and controlling the output of the water pump based on the output of the flow meter.

The method of the preceding clause, wherein the flow meter is a mass flow meter.

The method of any preceding clause, wherein the flow meter is a volumetric flow meter measuring a volumetric flow of the water output by the water pump, and the method further includes measuring the temperature of the water output from the water pump and converting the volumetric flow to a mass flow based on the measured temperature.

The method of the preceding clause, wherein measuring the temperature of the water output from the water pump includes using a temperature sensor located between the water pump and the boiler The method of any preceding clause, further comprising changing the output from the water pump when an operating condition of the turbine engine changes.

The method of any preceding clause, further comprising, when the engine is accelerating, increasing an output of the water from the water pump.

The method of any preceding clause, further comprising, when the engine is decelerating, decreasing an output of the water from the water pump.

The method of any preceding clause, further comprising operating a steam flow control valve to control the amount of steam being injected into the core air flow path.

The method of the preceding clause, wherein the steam flow control valve is operated when an operating condition of the turbine engine changes.

The method of any preceding clause, further comprising injecting the steam into the core air flow path at a plurality of steam injection zones to add mass flow to the core air.

The method of the preceding clause, wherein injecting the steam into the core air flow path includes injecting the steam into a primary steam injection zone, the primary steam injection zone being a steam injection zone positioned in the core air flow path such that steam injected into the primary steam injection zone flows into the primary combustion zone.

The method of any preceding clause, wherein injecting the steam into the core air flow path includes injecting steam into a secondary steam injection zone.

The method of any preceding clause, wherein the secondary steam injection zone is downstream of the combustor.

The method of any preceding clause, wherein the secondary steam injection zone is a cooling air flow path for a component of the turbine engine.

The method of any preceding clause, wherein the turbine engine includes the turbine recited in any preceding clause.

The method of any preceding clause, further comprising determining if the turbine engine is accelerating or decelerating.

The method of the preceding clause, further comprising, when the engine is accelerating, increasing the flow of fuel to the combustor.

The method of any preceding clause, wherein increasing the flow of fuel to the combustor includes opening a fuel metering valve.

The method of any preceding clause, further comprising, when the engine is accelerating, increasing the flow of the steam to the primary steam injection zone.

The method of the preceding clause, wherein the flow of the steam to the primary steam injection zone is increased proportionally to the increase in the amount of the fuel sent to the combustor.

The method of any preceding clause, wherein increasing the flow of the steam to the primary steam injection zone includes opening a primary steam flow control valve.

The method of any preceding clause, further comprising, when the engine is accelerating, increasing the flow of the steam to the secondary steam injection zone.

The method of the preceding clause, wherein increasing the flow of the steam to the secondary steam injection zone includes opening a secondary steam flow control valve.

The method of the preceding clause, further comprising, when the engine is decelerating, decreasing the flow of fuel to the combustor.

The method of any preceding clause, wherein decreasing the flow of fuel to the combustor includes closing a fuel metering valve.

The method of any preceding clause, further comprising, when the engine is decelerating, decreasing the flow of steam to the primary steam injection zone.

The method of the preceding clause, wherein the flow of the steam to the primary steam injection zone is decreased proportionally to the increase in the amount of the fuel sent to the combustor.

The method of any preceding clause, wherein decreasing the flow of the steam to the primary steam injection zone includes closing a primary steam flow control valve.

The method of any preceding clause, further comprising, when the engine is decelerating, decreasing the flow of the steam to the secondary steam injection zone.

The method of the preceding clause, wherein decreasing the flow of the steam to the secondary steam injection zone includes closing a secondary steam flow control valve.

The method of any preceding clause, wherein the secondary steam flow control valve is a pressure regulating valve operable to inject steam at an output pressure proportional to a control pressure.

The method of any preceding clause, wherein the control pressure is a pressure of the core air.

The method of any preceding clause, wherein the control pressure is the pressure of the compressed air.

The method of any preceding clause, wherein the control pressure is the pressure of the core air at an outlet of a compressor.

The method of the preceding clause, wherein the compressor is the compressor of the turbine engine of any preceding clause.

The method of any preceding clause, further comprising operating the turbine engine of any preceding clause.

The turbine engine of any preceding clause, further comprising a controller configured to execute the method of any preceding clause.

A computer readable storage medium having stored thereon a sequence of instructions for the method of any preceding clause.

Although the foregoing description is directed to certain embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:
1. A turbine engine for an aircraft, the turbine engine comprising:
a turbo-engine including:
a combustor positioned in a core air flow path to receive compressed air, the core air flow path including a plurality of core air flow path zones for core air to flow therethrough, the combustor being fluidly coupled to a fuel source to receive fuel, the fuel being injected into the combustor to mix with the compressed air to generate a fuel and air mixture, the fuel and air mixture being combusted in a primary combustion zone of the combustor to generate combustion gases;
an engine shaft; and
a turbine located downstream of the combustor to receive the combustion gases and to cause the turbine to rotate, the turbine coupled to the engine shaft to rotate the engine shaft when the turbine rotates;
a fan having a fan shaft coupled to the turbo-engine to rotate the fan shaft; and
a steam system fluidly coupled to the core air flow path to provide steam to the core air flow path to add mass flow to the core air, the steam system including:
a boiler located downstream of the combustor, the boiler receiving water and being fluidly connected to the combustor to receive the combustion gases and to boil the water to generate the steam;
a water pump in fluid communication with the boiler to direct a flow of water into the boiler;
a core steam flow control valve operable to control the flow of the steam into the core air flow path; and
a controller operatively coupled to the water pump to control an output of the water pump and the flow of water into the boiler, and operatively coupled to the core steam flow control valve to control an amount of the steam injected into the core air flow path, wherein the controller is configured to:
receive an input indicating a change in an operating condition of the turbine engine, the operating condition being a power level of the turbine engine;
determine if the turbine engine is being accelerated or decelerated; and
change, when the controller determines that the turbine engine is being accelerated or decelerated, the output of the water pump and to adjust the position of the core steam flow control valve to change the flow of the steam into the core air flow path.

2. The turbine engine of claim 1, wherein the steam system includes a condenser positioned downstream of the boiler to condense the water from the combustion gases, the water pump being fluidly connected to the condenser to receive the water from the condenser.

3. The turbine engine of claim 2, wherein the condenser generates an exhaust-water mixture, and
wherein the steam system includes a water separator located downstream of the condenser to receive the exhaust-water mixture, the water separator separating the water from the exhaust-water mixture, the water pump being fluidly connected to the water separator to receive the water from the water separator.

4. The turbine engine of claim 1, wherein, to control the output of the water pump, the controller is operatively coupled to the water pump to control a speed of the water pump.

5. The turbine engine of claim 4, wherein the water pump is a centrifugal pump.

6. The turbine engine of claim 1, wherein the water pump is a positive-displacement pump.

7. The turbine engine of claim 6, wherein, to control the output of the water pump, the controller is operatively coupled to the water pump to control the displacement of the water pump.

8. The turbine engine of claim 1, wherein the steam system includes a flow meter located between the water pump and the boiler to measure the output of the water pump, the controller being coupled to the flow meter to receive an input from the flow meter, to determine a mass flow of the water output by the water pump, and to control the output of the water pump to reach a target mass flow.

9. The turbine engine of claim 8, wherein the flow meter is a mass flow meter.

10. The turbine engine of claim 8, wherein the flow meter is a volumetric flow meter to measure a volumetric flow of the water output by the water pump, and
wherein the steam system includes a temperature sensor located between the water pump and the boiler to measure the temperature of the water output from the water pump, the controller being coupled to the temperature sensor to receive an input from the temperature sensor and convert the volumetric flow of the water output by the water pump measured by the flow meter to a mass flow of the water output by the water pump.

11. The turbine engine of claim 1, wherein the steam system is fluidly coupled to the core air flow path to inject the steam into the core air flow path at a plurality of steam injection zones, each steam injection zone of the plurality of steam injection zones corresponding to a core air flow path zone of the plurality of core air flow path zones.

12. The turbine engine of claim 11, wherein the steam system includes:
a primary steam flow control valve operable to control the flow of the steam into a primary steam injection zone, the primary steam injection zone being one steam injection zone of the plurality of steam injection zones, the primary steam injection zone being a steam injection zone positioned in the core air flow path such that the steam injected into the primary steam injection zone flows into the primary combustion zone, the controller being operatively coupled to the primary steam flow control valve and configured to adjust the position of the primary steam flow control valve to control the flow of the steam into the primary steam injection zone; and
a secondary steam flow control valve operable to control the flow of the steam into a secondary steam injection zone, the secondary steam injection zone being one steam injection zone of the plurality of steam injection zones, the controller operatively coupled to the secondary steam flow control valve and configured to adjust the position of the secondary steam flow control valve to control the flow of the steam into the secondary steam injection zone,
wherein the core steam flow control valve is one of the primary steam flow control valve or the secondary steam flow control valve.

13. The turbine engine of claim 12, wherein, when the controller determines that the turbine engine is being accelerated or decelerated, the controller is configured to change the output of the water pump and to adjust the position of the primary steam flow control valve to change the flow of the steam into the primary steam injection zone.

14. The turbine engine of claim 13, wherein, when the controller determines that the turbine engine is being accelerated, the controller is configured to increase the output of the water pump and to open the primary steam flow control valve to increase the flow of the steam into the primary steam injection zone.

15. The turbine engine of claim 13, wherein, when the controller determines that the turbine engine is being decelerated, the controller is configured to close the primary steam flow control valve to decrease the flow of the steam into the primary steam injection zone and, after closing the primary steam flow control valve, to decrease the output of the water pump.

16. The turbine engine of claim 15, wherein, when the controller determines that the turbine engine is being decelerated, the controller is further configured to close the secondary steam flow control valve to decrease the flow of the steam into the secondary steam injection zone after decreasing the output of the water pump.

17. The turbine engine of claim 1, wherein the steam system includes a steam turbine fluidly coupled to the boiler to receive the steam from the boiler and to cause the steam turbine to rotate, the steam turbine being coupled to the engine shaft to rotate the engine shaft when the steam turbine rotates.

18. The turbine engine of claim 17, wherein the core steam flow control valve is located upstream of the steam turbine.

19. The turbine engine of claim 17, wherein the core steam flow control valve is located downstream of the steam turbine.

20. The turbine engine of claim 17, wherein the core steam flow control valve is one of a plurality of steam flow control valves, the plurality of steam flow control valves including a first steam flow control valve and a second steam flow control valve, the first steam flow control valve located upstream of the steam turbine, and the second steam flow control valve located downstream of the steam turbine, and the controller is configured to change, when the controller determines that the turbine engine is being accelerated or decelerated, the position of the core steam flow control valve to change the position of the first steam flow control valve, the position of the second steam flow control valve, or the position of both the first steam flow control valve and the second steam flow control valve.

* * * * *